Figure 1:
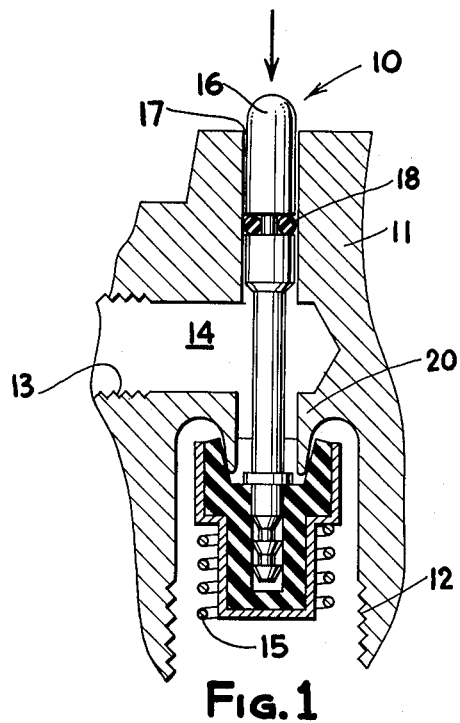

March 21, 1961   C. K. HUTHSING, SR   2,976,010
VALVE STRUCTURE
Filed April 11, 1958

INVENTOR.
CHARLES K. HUTHSING, SR.
BY Elliott & Pastoriza
ATTORNEYS

United States Patent Office 2,976,010
Patented Mar. 21, 1961

2,976,010

VALVE STRUCTURE

Charles K. Huthsing, Sr., Culver City, Calif., assignor to General Fire Extinguisher Corporation, a corporation of California Filed Apr. 11, 1958, Ser. No. 727,867

3 Claims. (Cl. 251—333)

This invention generally relates to a valve structure and more particularly to a valve structure which is preferably employed as a plunger assembly in a fire extinguisher head construction. As a consequence, the invention will be primarily described from the viewpoint of its embodiment in a portable fire extinguisher, although it will be appreciated that this improved valve structure may be advantageously applied in other analogous apparatus.

The present invention represents an improvement over applicant's co-pending application entitled "Valve Structure," filed June 6, 1956, and assigned Serial Number 589,804 now Patent No. 2,893,687. In the referred to co-pending application, a valve structure was disclosed comprising a plastic seal encircled by a metallic retainer. The seal was provided with a bore to receive a stem or lower end of a valve rod in friction tight engagement.

In the sealing action of the valve structure disclosed in the co-pending application, the plastic seal is designed to forcefully engage an annular valve seating member with an axial load. In addition, in a preferred form of a construction, an O-ring is employed in order to obtain a double-sealing effect.

After some experimentation under intermittent operation conditions, it was found that the O-ring had a tendency to cause a frictional drag on the operation of the plunger assembly from a normal to operated position. Thus, an appreciably greater manual force was required to effect operation of the fire extinguisher by urging the valve or plunger assembly downwardly than was desirable from a convenient operating standpoint. On the other hand, without the use of the secondary O-ring, the plunger assembly did not prove completely satisfactory from the standpoint of intermittent operation since some seepage occasionally occurred.

It is, therefore, an object of the present invention to provide a valve structure which requires only a very slight manual force to actuate from a closed to an open position, and yet which positively closes off flow when biased towards its normal seated position.

Another object of the present invention is to provide a plunger assembly for use with a fire extinguisher which will effectively provide positive sealing in a seated position regardless of frequent intermittent operation, and yet which is susceptible of being actuated to an open position with a relatively small manual force.

A further object of the present invention is to provide a plunger assembly for use with a fire extinguisher which may be economically manufactured with a minimum number of parts.

Other objects and advantages of the present invention are generally attained by providing a plunger assembly comprising in combination, a rod, a stem extending downwardly from the lower end of the rod, and a seal provided with a bore to receive the stem. The bore extends only partially through the seal, and the seal is provided with an annular portion which is integrally formed with and extends upwardly from an end portion of the seal. Operating co-acting with the annular portion is annular valve seat means which are dimensioned to be received into frictional engagement with the inner side walls of the annular end portion of the seal.

With this type of structure, an appreciably more positive sealing action is attained with fewer parts than was heretofore possible with the seal valve structure of applicant's above referred to co-pending application.

Figure 2:
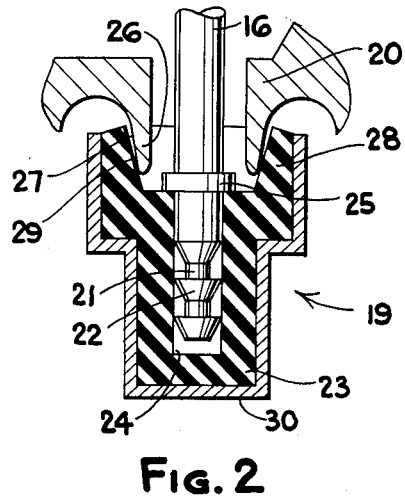

A better understanding of the present invention will be had by reference to the drawings showing a preferred embodiment of the invention, and in which:

Figure 1 is a fragmentary sectional view through a typical fire extinguisher head showing the valve structure or plunger assembly of the present invention disposed therein; and, Figure 2 is an enlarged view of a lower portion of the plunger assembly shown in Figure 1.

Referring now to the drawings, there is shown in Figure 1 a valve structure or plunger assembly 10 mounted within a typical fire extinguisher head 11. The head 11 is only partially shown for the purpose of describing and explaining the operation of the plunger assembly 10 in one typical application. The head 11 includes a lower internally threaded boss 12 for connection to the upper portion of a fire extinguisher tank (not shown). The head 11 is also provided with a discharge conduit 13 connecting with a chamber 14. With such an arrangement, upon downward actuation of the plunger assembly 10, gases or chemicals may pass up from the extinguisher tank through the interior of the boss 12 and thereafter into the chamber 14 to pass outwardly through the discharge conduit 13. Normally, the plunger assembly 10 is held in seated position by a spring 15 as shown in Figure 1.

The plunger assembly 10 includes an elongated cylindrical rod 16 passing downwardly through a close fitting bore 17 within the head 11. The rod is provided intermediate of its length with an O-ring 18 which forms a seal between the rod 16 and the bore 17, and thus prevent the escape of the tank contents up through the bore 17 when the valve or plunger assembly 10 is in actuated position.

The plunger assembly is conventionally operated in most extinguisher constructions by a handle or other lever which is adapted to exert a force in the direction of the arrow in Figure 1 and thus overcome the opposing force of the spring 15 and urge the plunger assembly 10 downward.

A primary feature of the preesnt invention resides in the construction of a seal assembly 19, and its co-operation or co-action with the valve seat 20 forming a lower part of the head 11. The valve or seal assembly 19 is frictionally secured to a lower end portion of the valve rod or stem 21. Towards this end, the stem 21 is provided with lands or radial projections 22, which are force fitted into the sealing material 23. In order to receive the stem 21, the sealing material 23 is provided with a bore 24 which extends downwardly from an upper end portion thereof, as viewed in Figure 2.

In order to limit the projection of the stem 21 into the bore 24 as well as to provide a sealing abutment closing off the upper end of the bore 24, an increased diameter member 25 is secured to the rod 16 and abuts against the upper portion of the sealing material 23.

The valve seat 20, as shown in Figure 2, includes a downwardly projecting flange or lip 26 which has its outer edge or sidewalls 27 sloped inwardly relative to the sealing assembly 19; the lip terminates in a radiused bottom end. In one form the sidewalls 27 are given a slope of approximately ten degrees relative to the axis of the rod 16.

The seal 23 is also provided with an annular portion 28 projecting upwardly from the upper surface in cup-like fashion. The annular portion 28 has inner sidewalls 29 which are sloped outwardly relative to the valve seat 20 at a slightly greater angle than the inward slope of the downwardly projecting lip 26. Furthermore, the inner sidewalls 29 of the annular portion 28 have a slightly greater maximum diameter than the minimum or lower edge diameter of the outer sidewalls 27 of the lip 26. On the other hand, the outer sidewalls 27 have a slightly greater maximum diameter than the minimum diameter of the inner sidewalls 29.

With such a construction, as the seal 23 is forced upwardly, for example, by the spring 15 into its closed position, the inner sidewalls 29 of the annular portion 28 will enable the lip 26 to be received a slight axial distance within the annular portion 28 until the bottom portion of outer sidewalls 27 of the lip 26 abut and press against the inner sidewalls 29 of the annular portion 28.

Because of the difference in slope between the inner sidewalls of the annular portion 28 and the outer sidewalls of the lip 26, these two surfaces will come into sealing pressure relationship with both a combined radial and axial force exerted between them tending to establish a very effective seal.

Test results have indicated that this type of seal will be effective even during intermittent operation and after extended usage of the extinguisher. Preferably, the seal material is formed of neoprene or other equivalent material which may be bonded to a seal retainer 30, for example. The seal retainer 30 is preferably a metallic member completely encircling the sealing material 33 and closing off its bottom end portion.

It will be appreciated that many modifications and changes may be made in the present invention without departing from the spirit and scope thereof as set forth in the following claims.

What is claimed is:

1. In a valve assembly: a valve seat including an annular end portion with outer sidewalls sloping inwardly relative to the longitudinal axis thereof, and terminating at its lower end with a bottom edge; a valve of resilient material for engagement with said valve seat, said valve including an upper portion with a recess in the upper surface thereof, the recess having inner sidewalls defined by a slightly greater slope with respect to the longitudinal axis of said valve seat than the outer sidewalls thereof, said outer sidewalls having a greater minimum diameter than the minimum diameter of the inner sidewalls of said recess, a lower portion integral with said upper portion and longitudinally aligned therewith; a valve operator longitudinally movable through the annular end portion of said valve seat and secured at its lower end to the lower portion of said valve; a seal retainer in engagement with the outside walls and the bottom of said valve, whereby said outer sidewalls will impose both an axially and radially directed sealing force upon said inner sidewalls in the region of the bottom edge of said outer sidewalls in response to the engagement of said valve with said valve seat by said operator, and said seal retainer limits the deformation of said valve.

2. Subject matter according to claim 1 wherein the bottom edge of said annular end portion is radiused such that the bottom edge will not penetrate said inner sidewalls in response to engagement therewith.

3. Subject matter according to claim 1 wherein said resilient material is neoprene plastic.

References Cited in the file of this patent

UNITED STATES PATENTS

| | | |
|---|---|---|
| 530,478 | Frisbie | Dec. 4, 1894 |
| 591,886 | Schrader | Oct. 19, 1897 |
| 881,060 | Cook | Mar. 3, 1908 |
| 2,091,874 | Neuhaus | Aug. 31, 1937 |
| 2,256,891 | Burman | Sept. 23, 1941 |
| 2,322,949 | Lux | June 29, 1943 |
| 2,447,510 | Langdon | Aug. 24, 1948 |
| 2,717,112 | Ralston | Sept. 6, 1955 |
| 2,821,356 | Rand | Jan. 28, 1958 |

FOREIGN PATENTS

| | | |
|---|---|---|
| 889,553 | France | of 1943 |